United States Patent [19]

Hubbard

[11] 3,949,129

[45] Apr. 6, 1976

[54] ELASTOMER COATED FABRIC

[76] Inventor: Albert L. Hubbard, 677 E. Channel Islands Blvd., Oxnard, Calif. 93030

[22] Filed: Nov. 9, 1972

[21] Appl. No.: 305,175

Related U.S. Application Data

[63] Continuation of Ser. No. 41,290, May 28, 1970, abandoned.

[52] U.S. Cl. ............... 428/190; 139/425 R; 428/80; 428/229
[51] Int. Cl. ........................................... D03d 13/00
[58] Field of Search ............ 161/77, 82, 91, 93, 99, 161/143, 144, 190; 117/122 H, 133, 132 CB, 132 BS, 132 C, 135.1, 138.8; 139/425 R, 420 R

[56] References Cited
UNITED STATES PATENTS

| | | | |
|---|---|---|---|
| 2,202,013 | 5/1940 | Lougheed | 161/91 |
| 2,384,771 | 9/1945 | Ryan | 161/91 |
| 2,827,414 | 3/1958 | Bussard et al. | 161/91 |
| 3,069,746 | 12/1962 | Scharf | 161/91 |
| 3,073,004 | 1/1963 | Zeise | 161/91 |
| 3,087,699 | 4/1963 | Foster | 161/91 |
| 3,154,459 | 10/1964 | Cranston | 161/91 |
| 3,252,833 | 5/1966 | Skobel | 161/91 |
| 3,389,016 | 6/1968 | Holtz et al. | 117/122 H |
| 3,461,025 | 8/1969 | Coleman et al. | 161/91 |
| 3,533,124 | 10/1970 | Polnau et al. | 161/91 |

Primary Examiner—George F. Lesmes
Assistant Examiner—James J. Bell

[57] ABSTRACT

A woven fabric comprising a laminate that consists of a warp comprising metallic fibers with or without non-metallic fibers, and a weft that comprises non-metallic resilient fibers, adjacent portions of the weft being offset in opposite directions to have a wave form, the fabric thus formed being coated with an elastomer and has non-setting elasticity as a wrapper around objects such as poles, tubes, and the like.

9 Claims, 2 Drawing Figures

ELASTOMER COATED FABRIC

This is a continuation of application Ser. No. 041,290, filed May 28, 1970, now abandoned.

BACKGROUND OF THE INVENTION

1. Field of the Invention

Primarily as a wrapping material around cylindrical or tubular objects such as fishing rods, golf shafts, vaulting poles.

2. Prior art

The rick-rack shape of the present wrapper fabric is shown in U.S. Pat No. 2,728,919 which, otherwise, has nothing suggestive of the present fabric. As shown in U.S. Pat. No. 2,195,632, a tape formed of bias-woven open-mesh wire fabric covered by rubber latex, is known. U.S. Pat. No. 3,472,289 discloses a heater fabric using both metal and non-metal fibers coated with resin and does not suggest imparting stretchability to wires, wire strands, or wire fabrics in one direction of the fabric.

The present invention provides a fabric tape having important advantages over the above art. When a metallic strand or wire, coated with synthetic resin which is then cured, is bent, the resin coating bends with the strand or wire, causing the latter to become "set" as a result of the strong cohesion between the resin coating and the metal strand or wire.

However, when metal strands are coated with an elastomer, i.e., a synthetic polymer with rubber-like characteristics, and incorporated in a resin laminate and then cured, the cured elastomer is a reinforcement in the direction of the bend of the strands but will not stretch because such a coating will allow some movement between the wire and the other portions of the laminate.

Such elastomer-coated metal strands, in the warp of a laminate, serve to reinforce the same in the direction of the warp. Also, a straight wire, so coated and cured, will allow for some free bend in the direction of the wire.

Examples of commercially produced elastomers above contemplated are butyl rubber, polyurethane rubber, and silicone rubber.

SUMMARY OF THE INVENTION

The present laminate 5 comprises, generally, a layer of a resilient fabric 6 constructed of a warp 7 of metallic fibers or such fibers intermixed with non-metallic fibers, and a weft 8 of resilient non-metallic fibers, the fabric 6, either during weaving thereof of after being woven, has the weft strands of non-metallic fibers transversely displaced, alternately, at longitudinally spaced portions, thereby imparting to the fabric a wavy or rick-rack shape which provides the fabric with stretchability and elasticity. Such a fabric is capable of elongation if stretched, the crests 9 thereof flattening according to the degree of stretch. This woven fabric 6 is coated with an elastomer which is cured to provide said fabric with stretch characteristics and a "memory" to return to rick-rack form after stretching.

It is an object of this invention to provide a laminate that is constructed of the warp, weft and coating materials, as above outlined.

This invention also has for its objects to provide such means that are positive in operation, convenient in use, easily installed in a working position and easily disconnected therefrom, economical of manufacture, relatively simple and of general superiority and servicability.

The invention also comprises novel details of construction and novel combinations and arrangements of parts, which will more fully appear in the course of the following description, which is based on the accompanying drawing. However, said drawing merely shows, and the following specification merely describes, one embodiment of the present invention, which is given by way of illustration or example only.

In the drawing like reference characters designate similar parts in the several views:

DESCRIPTION OF THE PREFERRED EMBODIMENT

The elements of the above generally described laminate 5 may be constructed as follows:

The elements 11 of the warp 7 advantageously comprise drawn, ferrous wire, metallic fibers or strands having the main characteristic of pliability or a mixture of such metallic fibers and non-metallic fibers, as resins, glass, etc.

The weft 8 preferably comprises non-metallic fibers either natural or synthetic and, in this case, may comprise fiber or spun glass of strands capable of being formed as a yarn.

Figure 1:
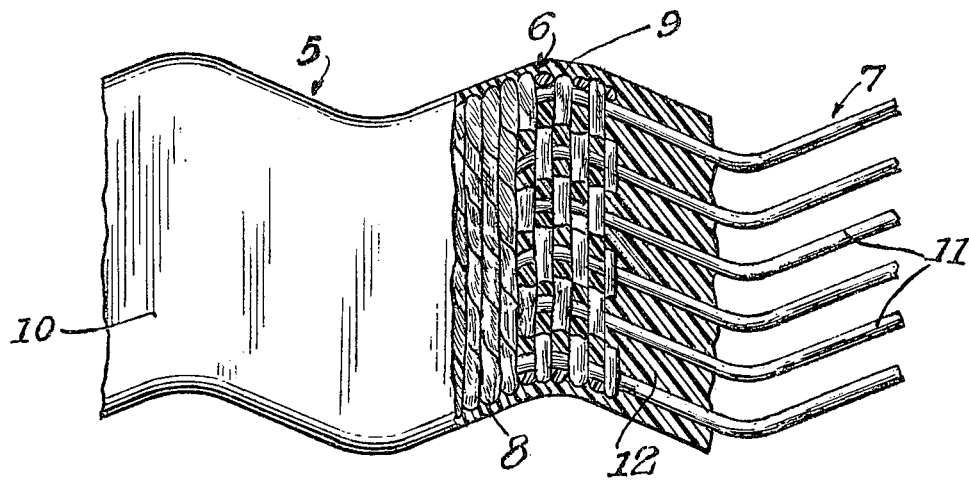
FIG. 1 is a semi-diagrammatic view of a fabric in the form of a tape according to the present invention.

As shown in FIG. 1, the fabric, usually in the form of a narrow tape, has longitudinally spaced portions alternately oppositely displaced in the plane of the fabric to form the apices 9 while the weft retains the tape in substantially uniform width throughout its length. The warp elements, whether of drawn wire or containing ferrous strands will become "set" as thus bent. Although set, the rick-rack shape of the tape will be elastic and capable of being partly or even wholly straightened under longitudinal pull. The tape, nevertheless, remains elastic and will return to its rick-rack shape when the pull is released. Such a tape, when used as a wrapper aroung an object, for instance a pole, rod or tube, will be under elastic tension to insure that the warp will be tight.

The weft yarn 8 is interlaced with the warp elements 11 in a manner, as suggested in FIG. 1, and trained over the outer warp members to retain said members in substantially parallel, tape-like arrangement.

According to the invention, the above-described fabric is coated with an elastomer 10 chosen from butyl rubber, polyurethane resins (isocyanate resins) and silicone rubber, or one of the other more resilient long chain polymers, such as acrylonitrile-butadiene rubber, a rubber-based and solvent-systemed chemical, produced by Stabond Corp. of America, Gardena, California, (marketed as Nitrol C-511). The long chain polymer preferred from among those above mentioned is polyurethane of suitable soft, and flexible plasticity.

The elastomer used should be soft and pliable, suitable plasticizers being commonly available to provide such consistency to the elastomer chosen.

As shown in FIG. 1, such an elastomer 12 may completely enclose the fabric 8 and then be cured or the same may be independently cured and cemented to the above-described fabric, or may be laminated, as one ply with such a fabric, as a second ply and then cured to effect bonding to the fabric.

Figure 2:
FIG. 2 is an enlarged cross-section view of a layered material comprising alternate plies of laminate and layers of natural and/or synthetic non-metallic fibers.

A multi-layer laminate may be fabricated of alternate layers of laminates 5, and non-metallic material formed of fiber glass, similarly coated by the described elastomer. FIG. 2 shows such a laminated structure comprising laminates 5 and non-metallic plies 14 of fibrous or spun material, as contemplated above.

It will be understood that the depth of undulations in the tape and the number thereof, in a given length, may be varied according to the degree of stretch or elasticity desired. The laminate is stretched by flattening the undulations, whereas the material itself, having little or no inherent stretch, serves to prevent unconstrolled stretching of the laminate thereby preserving the elasticity thereof.

While the foregoing has illustrated and described what are now contemplated to be the best modes of carrying out the invention, the constructions are, of course, subject to modification without departing from the spirit and scope of the invention.

I claim:

1. A woven fabric tape comprising a laminate consisting of
   a. a warp consisting of substantially parallel flexible elongated elements containing ferrous fibers or strands, and
   b. a weft formed of yarn elements of resilient non-metallic fibers interwoven with and around the elements of the warp, and defining a tape of predetermined constant width throughout the length thereof,
   c. the weft elements being transversely displaced in the plane of the tape, alternately, at longitudinally and uniformly spaced portions to impart to the fabric tape, and hence the warp elements, a wavy or rick-rack shape and the ability to elastically elongate,
   d. the tape, including the warp elements, upon the application of tension longitudinally thereto, elongating through a general straightening of the wavy or rick-rack shape thereof, the warp elements limiting the elongation of the tape,
   e. and an elastomer coating having its opposite edges extending beyond and in parallel adjacency to the opposite edges of the woven warp and weft elements of the tape.

2. A woven fabric tape according to claim 1 in which the fibers or strands of the warp elements are intermixed with non-metallic fibers.

3. A woven fabric tape according to claim 1 in which the weft is so interwoven with the elements of the warp as to retain the latter in the mentioned substantially parallel arrangement.

4. A woven fabric tape according to claim 1 in which the fabric tape has its weft yarn formed in interlacing engagement with the warp elements, said weft elements being trained around the outer warp elements to retain the latter in tape-like arrangement.

5. A woven fabric tape according to claim 1 in which the elastomer coating consists of a long chain polymer material provided with a plasticizer.

6. A woven fabric tape according to claim 5 in which the polymer material is an elastomer selected from the group consisting of butyl rubber, silicone rubber, and polyurethane.

7. A woven fabric tape according to claim 5 in which the polymer material is an elastomer selected from the group consisting of polyurethane resin.

8. A first woven fabric tape comprising a laminate consisting of:
   a. a warp consisting of flexible elongated elements containing ferrous fibers or strands, and
   b. a weft formed of yarn elements of resilient non-metallic fibers interwoven with the elements of the warp, and defining a tape of predetermined constant width throughout the length thereof,
   c. the weft elements being transversely displaced in the plane of the tape, alternately, at longitudinally spaced portions to impart to the fabric tape, and hence the warp elements, a wavy or rick-rack shape and the ability to elastically elongate,
   d. at least a second such fabric tape, said fabric tapes comprising two space plies,
   e. a ply of fibrous or spun non-metallic material between the plies of fabric tapes,
   f. an elastomer coating over said three plies, the same consisting of a long chain polymer selected from a group consisting of butyl rubber, silicone rubber, and polyurethane, and
   g. the tape, including the warp elements, upon the application of tension longitudinally thereto, elongating through a general straightening of the wavy or rick-rack shape thereof, the warp elements limiting the elongation of the tape.

9. A multi-ply tape according to claim 8 in which the fibrous or spun non-metallic ply comprises fiber glass.

* * * * *